United States Patent
Wren

(10) Patent No.: US 12,262,843 B2
(45) Date of Patent: Apr. 1, 2025

(54) DEVICE AND SYSTEM FOR A DIVIDER INSERT FOR A FOOD-HEATING APPLIANCE

(71) Applicant: Happiier, LLC, Deland, FL (US)

(72) Inventor: Emilie Wren, Deland, FL (US)

(73) Assignee: Happier, LLC, Deland, FL (US)

( * ) Notice: Subject to any disclaimer, the term of this patent is extended or adjusted under 35 U.S.C. 154(b) by 424 days.

(21) Appl. No.: 17/574,502

(22) Filed: Jan. 12, 2022

(65) Prior Publication Data

US 2022/0218147 A1 Jul. 14, 2022

Related U.S. Application Data

(60) Provisional application No. 63/271,370, filed on Oct. 25, 2021, provisional application No. 63/136,944, filed on Jan. 13, 2021.

(51) Int. Cl.
*A47G 27/00* (2006.01)
*A47J 36/16* (2006.01)
*A47J 27/082* (2006.01)

(52) U.S. Cl.
CPC .............. *A47J 36/16* (2013.01); *A47J 27/082* (2013.01)

(58) Field of Classification Search
CPC ...... A47J 27/082; A47J 36/16; A47J 37/1276; A47J 37/0641; A47J 27/084; A47J 36/08; A47J 36/20; A47J 36/22
USPC ................................. 220/573.5, 23.88, 23.86
See application file for complete search history.

(56) References Cited

U.S. PATENT DOCUMENTS

| | | | |
|---|---|---|---|
| 275,302 A * | 4/1883 | Welling | |
| 513,405 A * | 1/1894 | Messick | |
| 712,793 A * | 11/1902 | Henis et al. | |
| 1,470,199 A * | 10/1923 | Small | A47J 27/13 220/23.88 |
| 1,630,787 A * | 5/1927 | Cullen | A47J 36/20 220/23.88 |
| 2,048,572 A * | 7/1936 | Smith | A47J 36/20 220/573.5 |
| 3,724,711 A * | 4/1973 | George | A47J 36/16 220/573.1 |
| D604,992 S * | 12/2009 | Klein | D7/541 |
| 8,534,483 B1 * | 9/2013 | Rodriguez | B65F 1/085 220/23.88 |
| 9,474,411 B2 * | 10/2016 | Gattineri | A21B 3/135 |
| 2004/0083904 A1 * | 5/2004 | Wei-Wen | A47J 27/04 99/483 |
| 2009/0095169 A1 * | 4/2009 | York | A47J 27/004 220/573.5 |
| 2018/0206672 A1 * | 7/2018 | Grace | A47J 45/068 |
| 2022/0265087 A1 * | 8/2022 | Wilkins | A47J 36/20 |

* cited by examiner

Primary Examiner — Stephen J Castellano
(74) Attorney, Agent, or Firm — H. Brock Kolls

(57) ABSTRACT

A device and system for a divider insert for a food-heating appliance comprising a divider insert of a geometric shape to create a container to receive uncooked food. A user may select one or a plurality of different geometric shapes to receive different volumes of food. Multiple foods may be cooked simultaneously according to the number of containers and shapes selected.

9 Claims, 20 Drawing Sheets

DEVICE AND SYSTEM FOR A DIVIDER INSERT FOR A FOOD-HEATING APPLIANCE

RELATED APPLICATIONS

Figure 1:
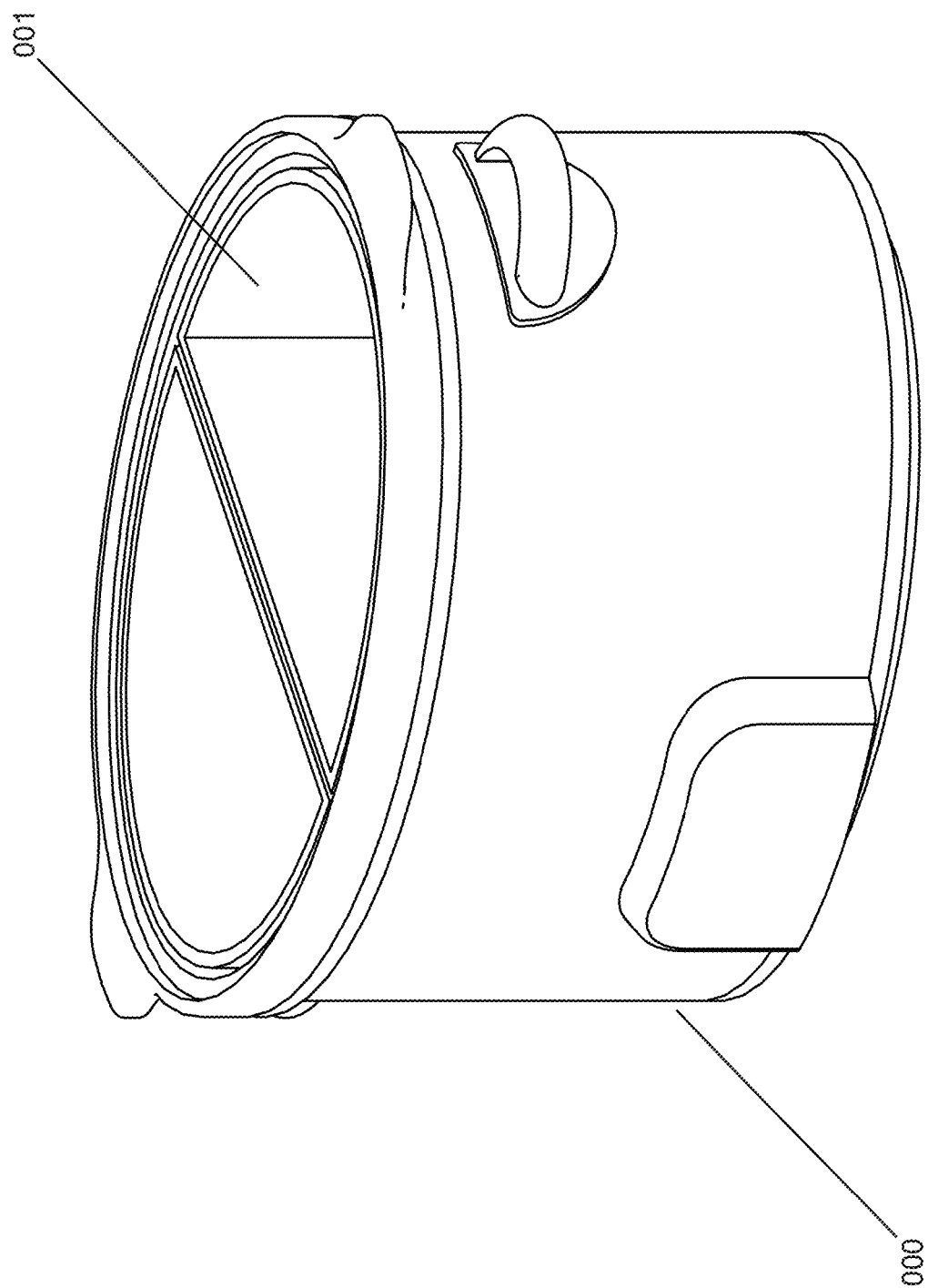

This application claims priority to U.S. Provisional Patent Application No. 63/136,944, filed on Jan. 13, 2021, and to U.S. Provisional Patent Application No. 63/271,370, filed on Oct. 25, 2021, which are incorporated herein by reference in their entirety, including any addendums, appendixes, and attachments thereto, to the extent these applications does not conflict with the present disclosure herein.

BACKGROUND

The following discussion is not to be deemed admitted prior art but merely related art to show possible background and information related to cooking device compartments.

Consumers use a variety of food-heating appliances generally known as slow-cookers and pressure-cookers ("food-heating appliance").

Conventional food-heating appliances generally contain a single-size cooking unit. This cooking unit is generally measured by volume and allows for both larger and smaller foods.

Many consumers desire a way to cook multiple foods simultaneously within the same cooking unit.

Conventional food-heating appliances, like slow cookers, for example, have a heating unit and a cooking unit. The heating unit typically has one or more electric heating elements adapted to supply heat to the cooking unit. Cooking units are generally ceramic in nature and together with the heating unit cook foods slowly and evenly.

Another type of food-heating appliance is a pressure cooker. A pressure cooker contains a pot that includes an airtight lid that seals and locks to the main body of the pot. Food items are placed in a cooking unit in a pressure cooker along with a liquid (usually water) and the pressure cooker is heated.

Currently, there are few solutions to cook multiple foods simultaneously within the same cooking unit. Some of these solutions use bowls set inside a cooking unit. Still, other solutions use wire racks inside the cooking unit. Still, other solutions require the consumer to monitor the cooking unit and insert and remove foods at various times.

Current slow cookers solutions only allow the user to place items in one pot and cook together. Flavors are melded and the result causes a loss of enjoyment of all flavors. Additionally, if a user wants to make two separate dishes, this would require two separate crock-pots or expensive ceramic dividers.

Each of these possible background solutions fails to meet the needed solution because they do not allow a user to simultaneously cook multiple foods of varying sizes in the cooking unit.

Therefore, a need exists for a novel device to divide the cooking unit into compartments, or containers, of varying sizes and allow for the simultaneous cooking of multiple foods.

BRIEF SUMMARY OF THE INVENTION

This invention relates to a food-heating appliance and more particularly to a food-heating appliance having a plurality of divider inserts, or containers, for cooking different volumes of food simultaneously.

Disclosed are numerous aspects of a unique and inventive device and system for a divider insert for a food-heating appliance configured to receive, retain, and cook foods.

This invention allows for each ingredient to cook along with the recipe instructions while maintaining the original, or desired flavor. Additionally, two or more items can be cooked simultaneously allowing the user to enjoy multiple dishes at once.

One possible embodiment of this invention uses a silicone insert which is less expensive, reusable and allows the user to make 2, 3 or 4 items at the same time without need for additional slow cooker devices.

It is desirable to have a device and system for a divider insert for a food-heating appliance. Furthermore, it is desirable to have a device and system for a divider insert for a food-heating appliance that can be easily inserted and removed from a cooking unit. Furthermore, it is desirable to have a device and system for a divider insert for a food-heating appliance that varies in size volumetrically and varies in shape in geometrically. Furthermore, it is desirable to have a device and system for a divider insert for a food-heating appliance that is safe to use by protecting the consumer from the possibility of burns. Furthermore, it is desirable to have a device and system for a divider insert for a food-heating appliance that is re-usable. Furthermore, it is desirable to have a device and system for a divider insert for a food-heating appliance because cooking units are often difficult to clean.

The disclosed invention advantageously fills these needs and addresses the aforementioned deficiencies by providing an easy-to-use, plurality of volumetric sizes, plurality of geometric shapes, re-usable, protective divider insert, or container, for a food-heating unit.

BRIEF DESCRIPTION OF THE DRAWINGS a device and system for a divider insert for a food-heating appliance is illustrated by way of example, and not by way of limitation, in the figures of the accompanying drawings.

While aspects of a device and system for a divider insert for a food-heating appliance will be described with reference to the details of the embodiments of the invention shown in the drawings (and some embodiments not shown in the drawings), these details are not intended to limit the scope of the invention.

FIG. 1. A perspective view of an embodiment, two divider inserts, of a device and system for a divider insert for a food-heating appliance inserted in a typical food-heating appliance.

Figure 2:
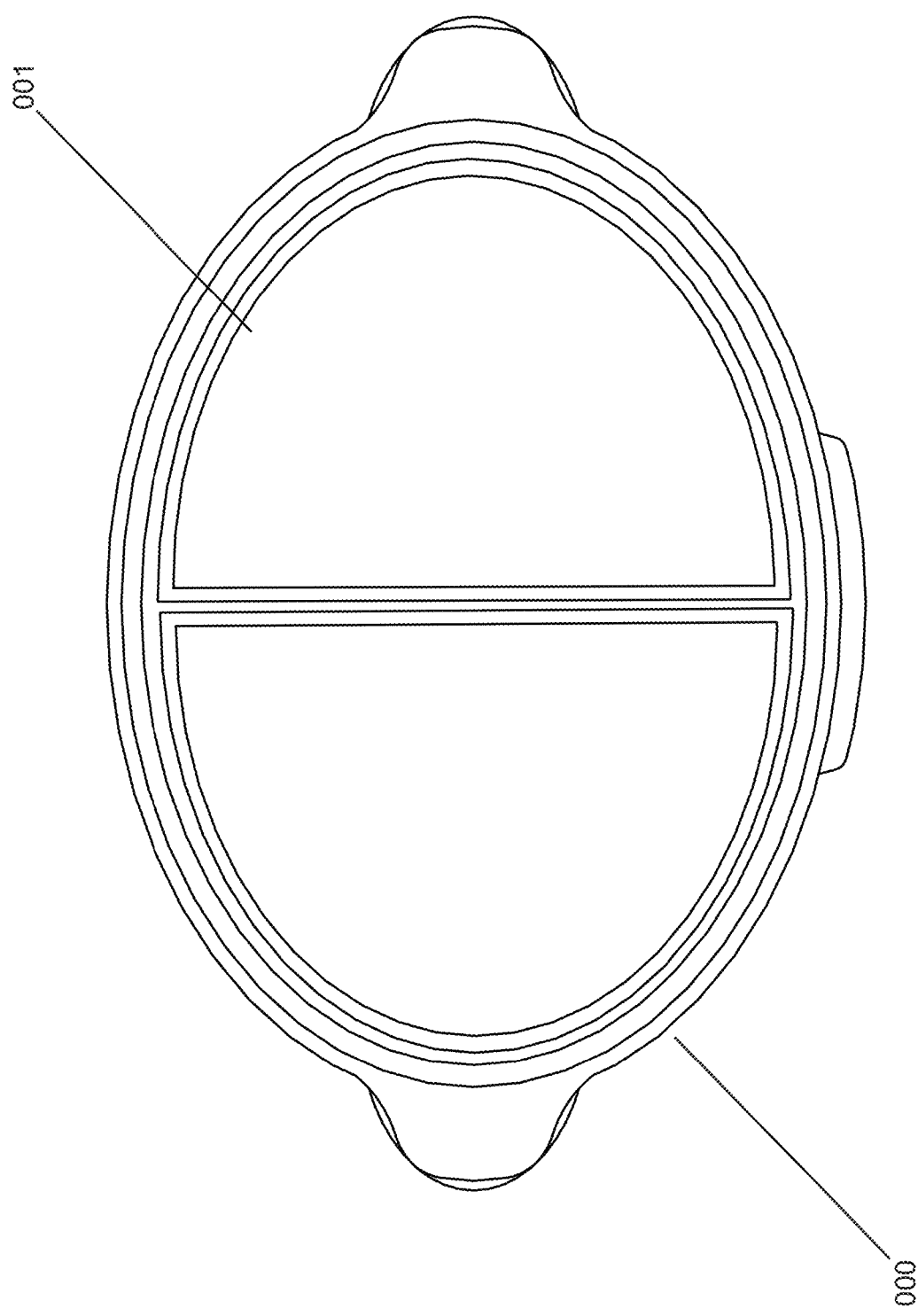

FIG. 2. A top-down view of an embodiment, two divider inserts, of a device and system for a divider insert for a food-heating appliance inserted in a typical food-heating appliance.

Figure 3:
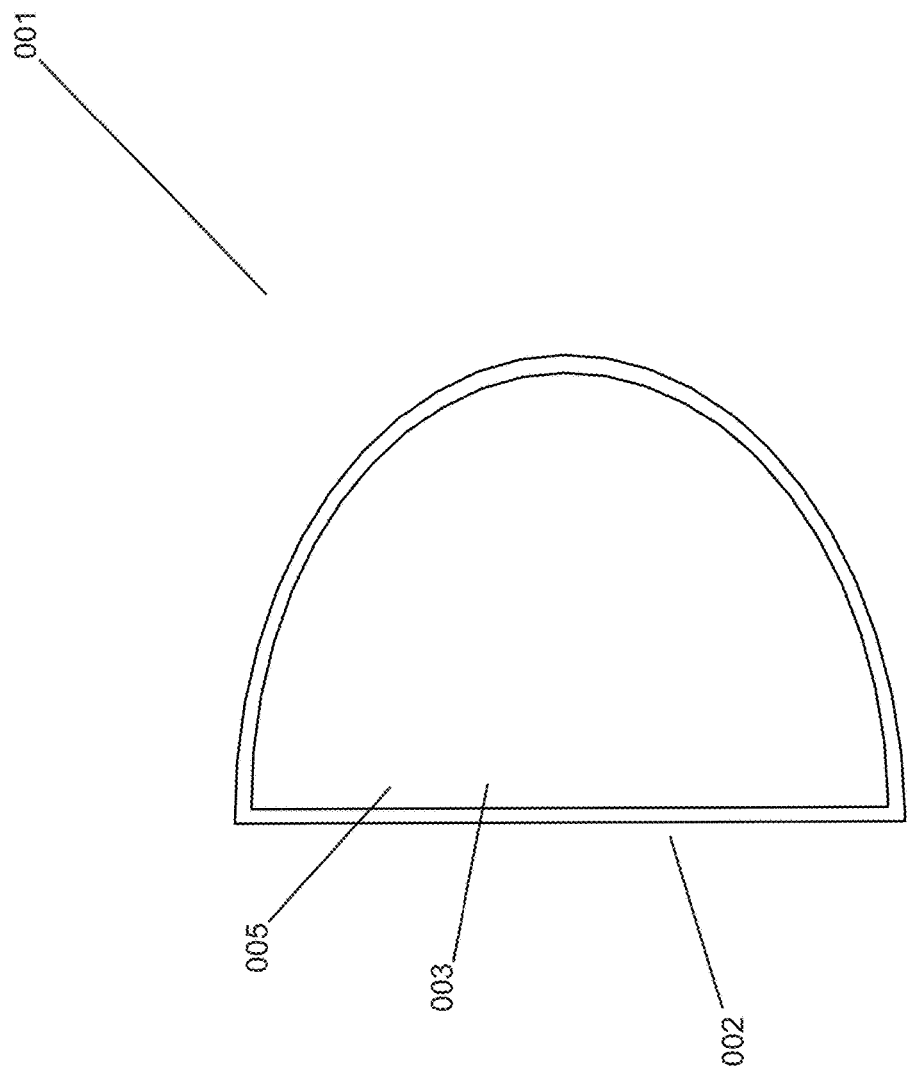

FIG. 3. A top-down view of an embodiment, one-half of two inserts, of a device and system for a divider insert for a food-heating appliance.

Figure 4:
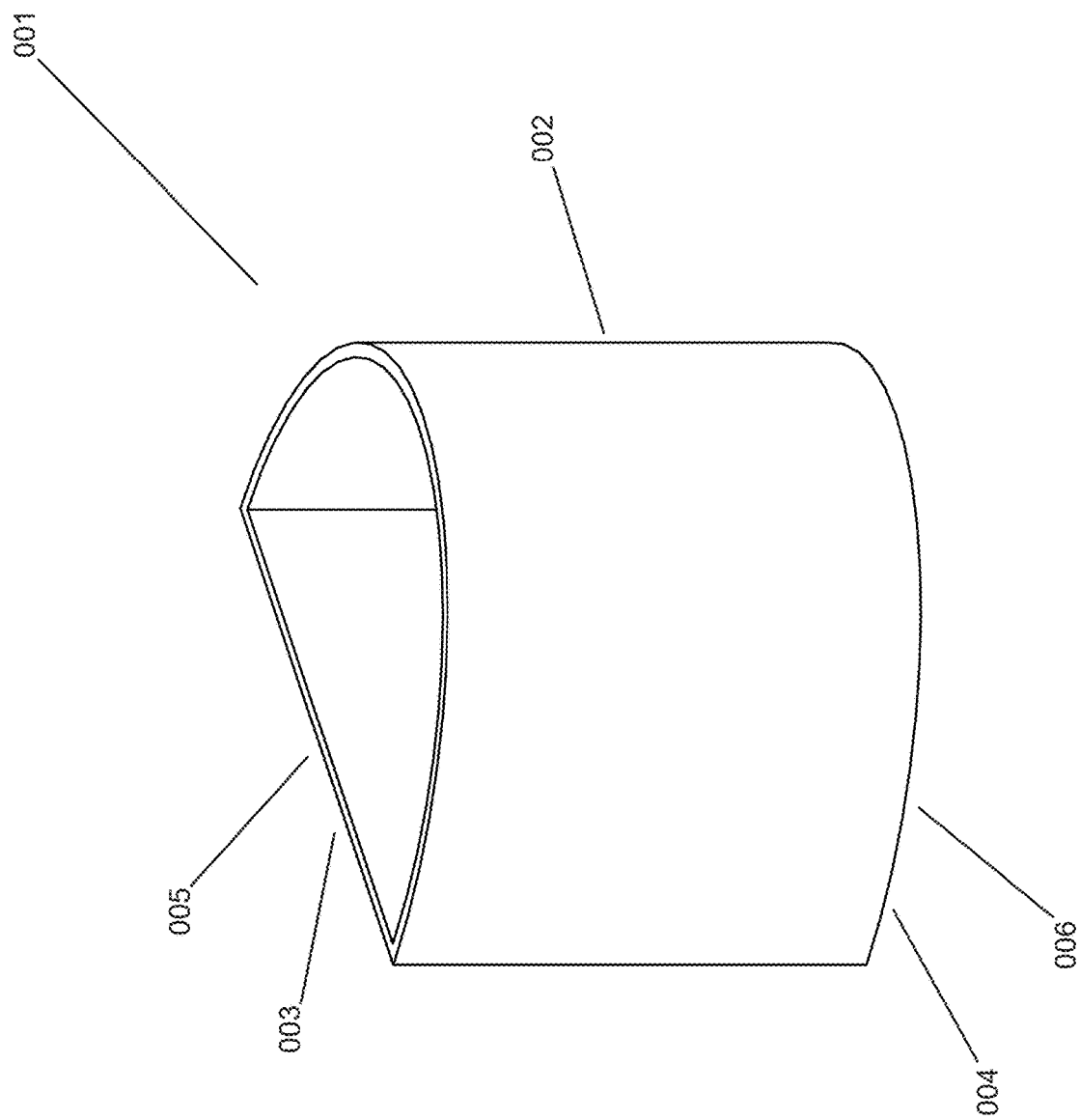

FIG. 4. A perspective view of an embodiment, one-half of two inserts, of a device and system for a divider insert for a food-heating appliance.

Figure 5:
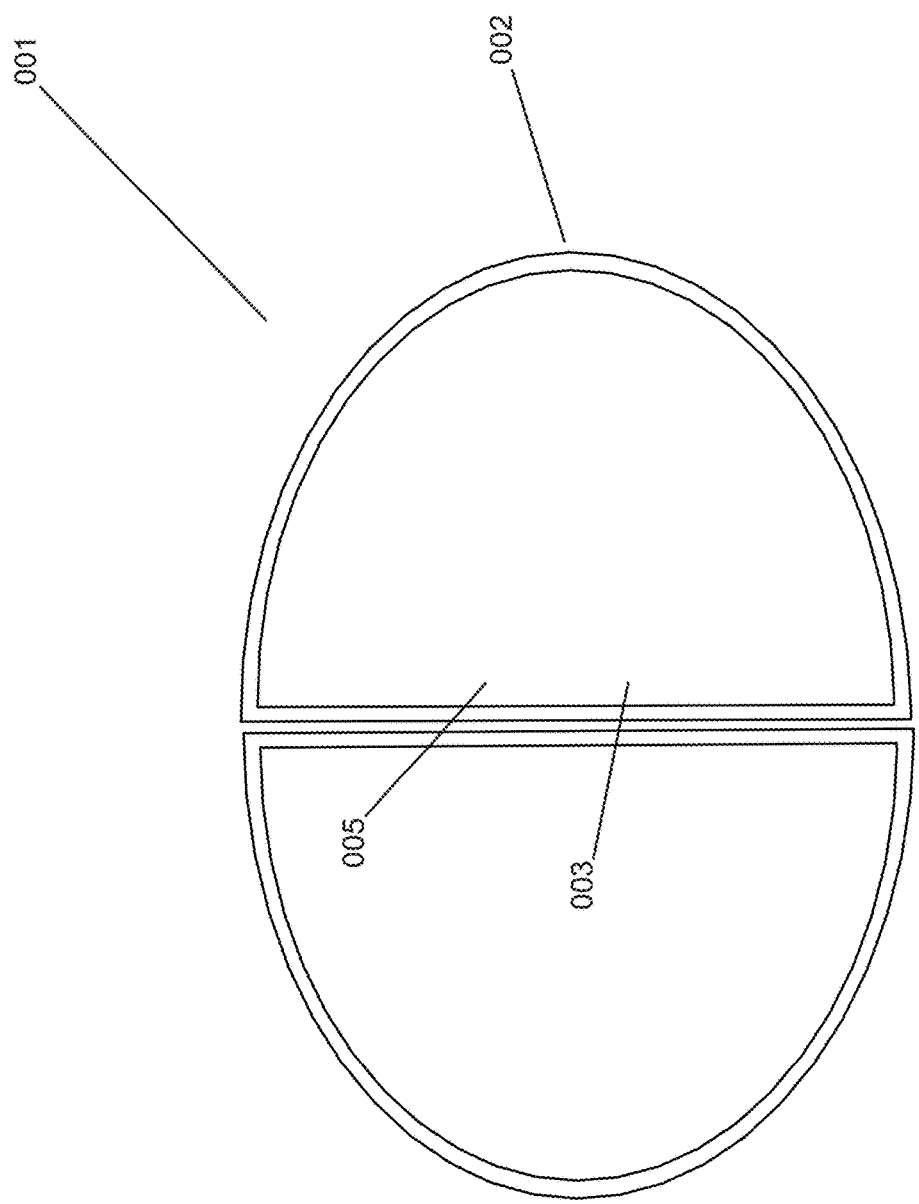

FIG. 5. A top-down view of an embodiment, two divider inserts, of a device and system for a divider insert for a food-heating appliance.

Figure 6:
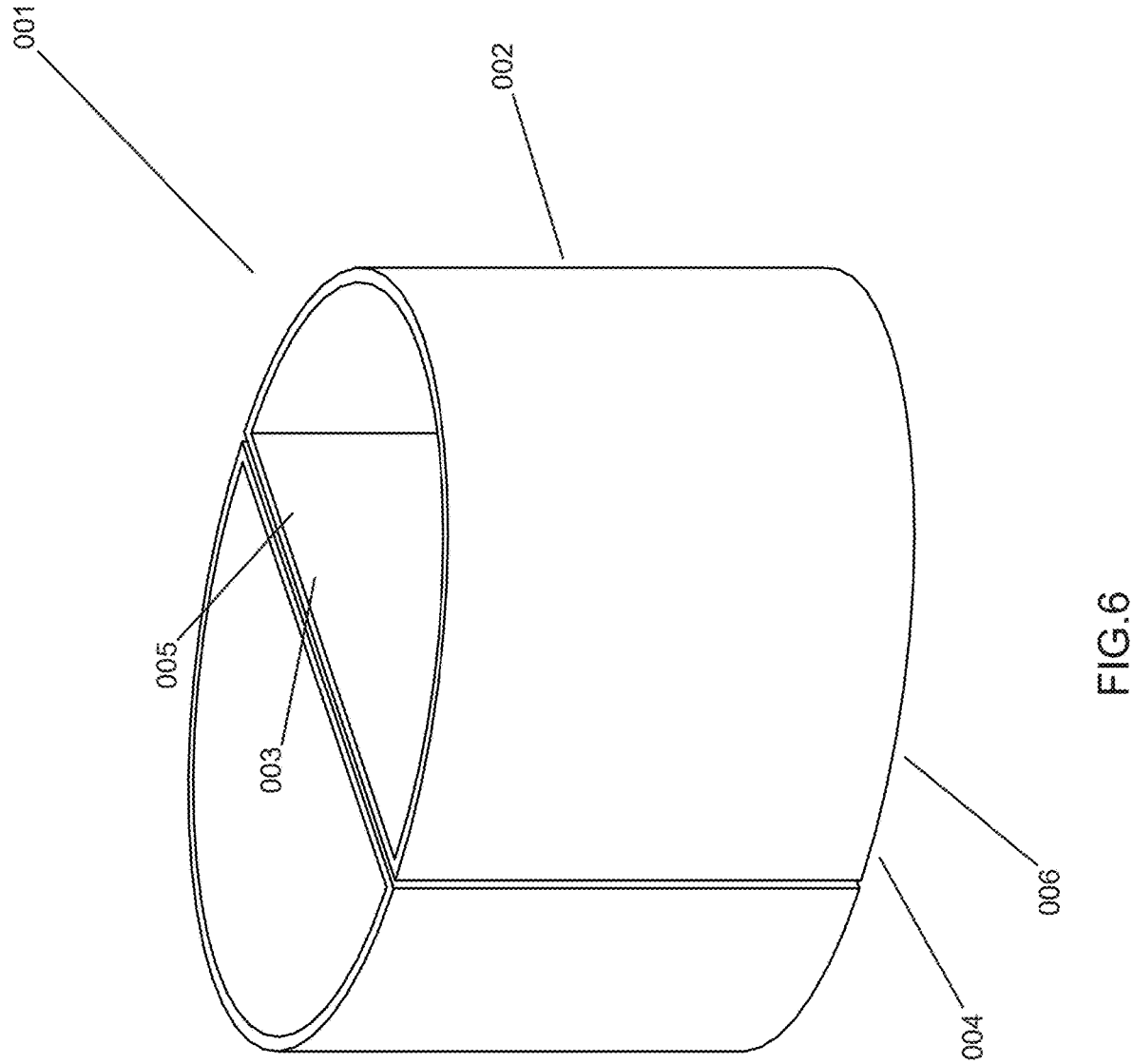

FIG. 6. A perspective view of an embodiment, two divider inserts, of a device and system for a divider insert for a food-heating appliance.

Figure 7:
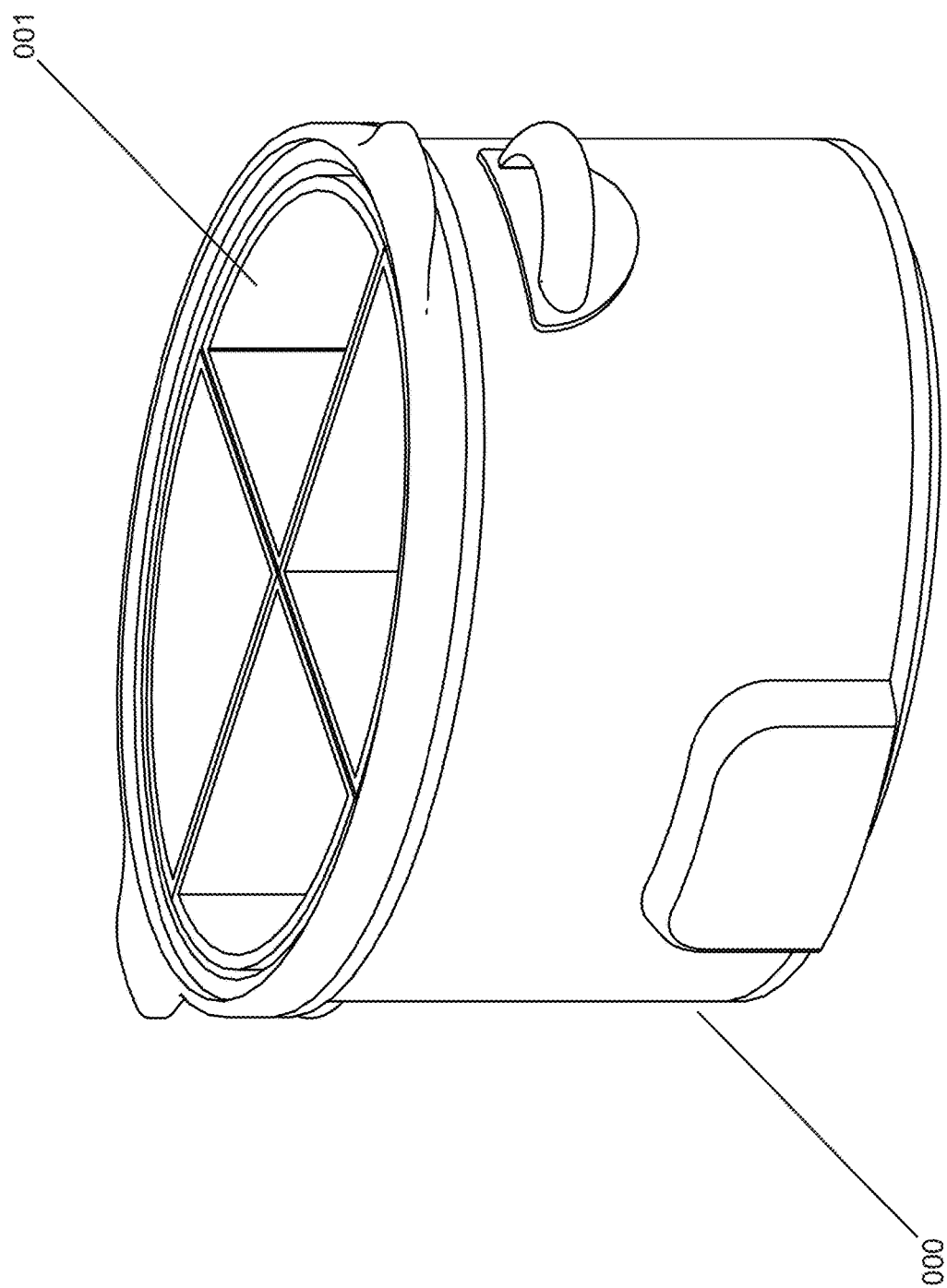

FIG. 7. A perspective view of an embodiment, four divider inserts, of a device and system for a divider insert for a food-heating appliance inserted in a typical food-heating appliance.

Figure 8:
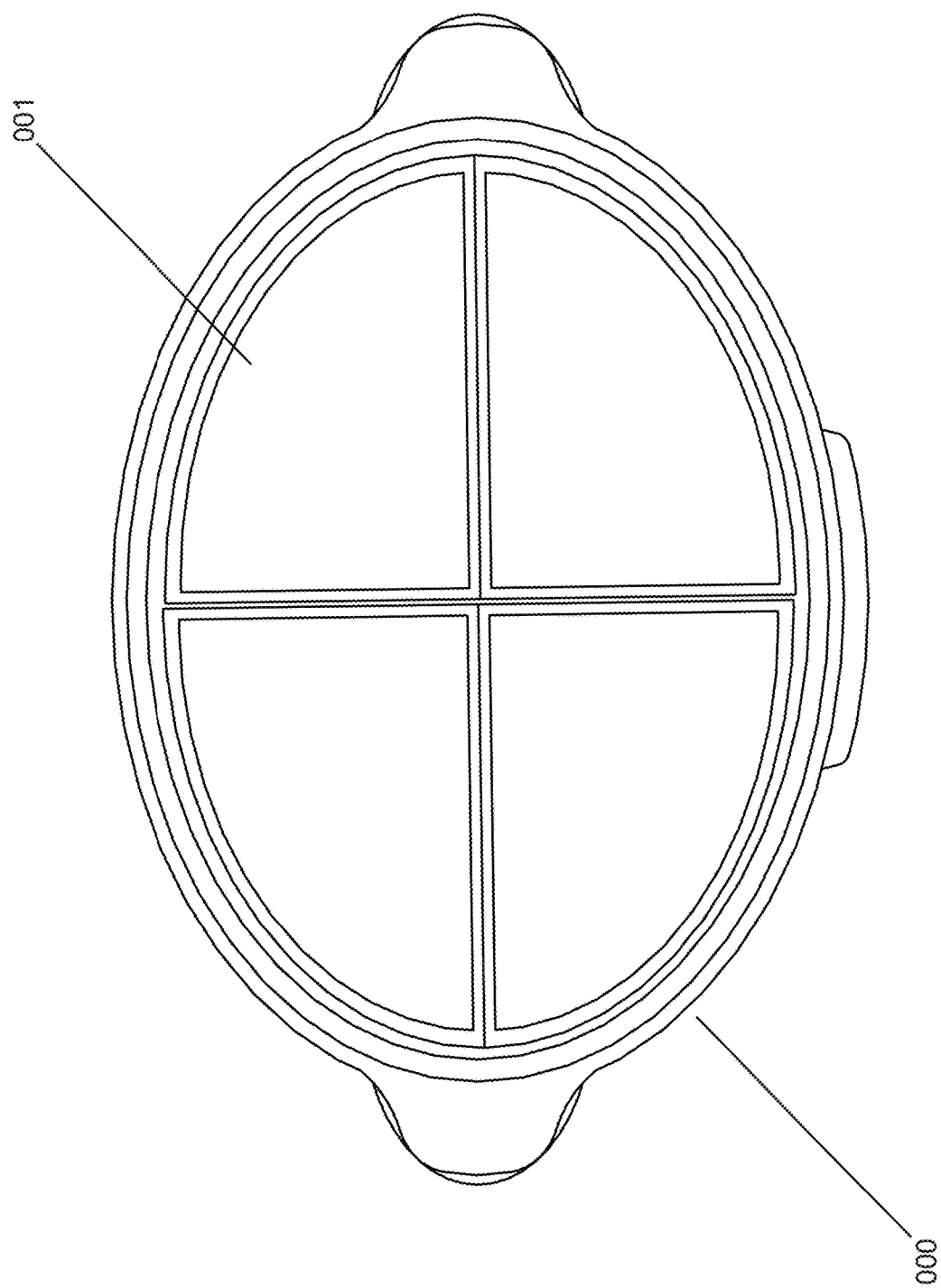

FIG. 8. A top-down view of an embodiment, four divider inserts, of a device and system for a divider insert for a food-heating appliance inserted in a typical food-heating appliance.

Figure 9:
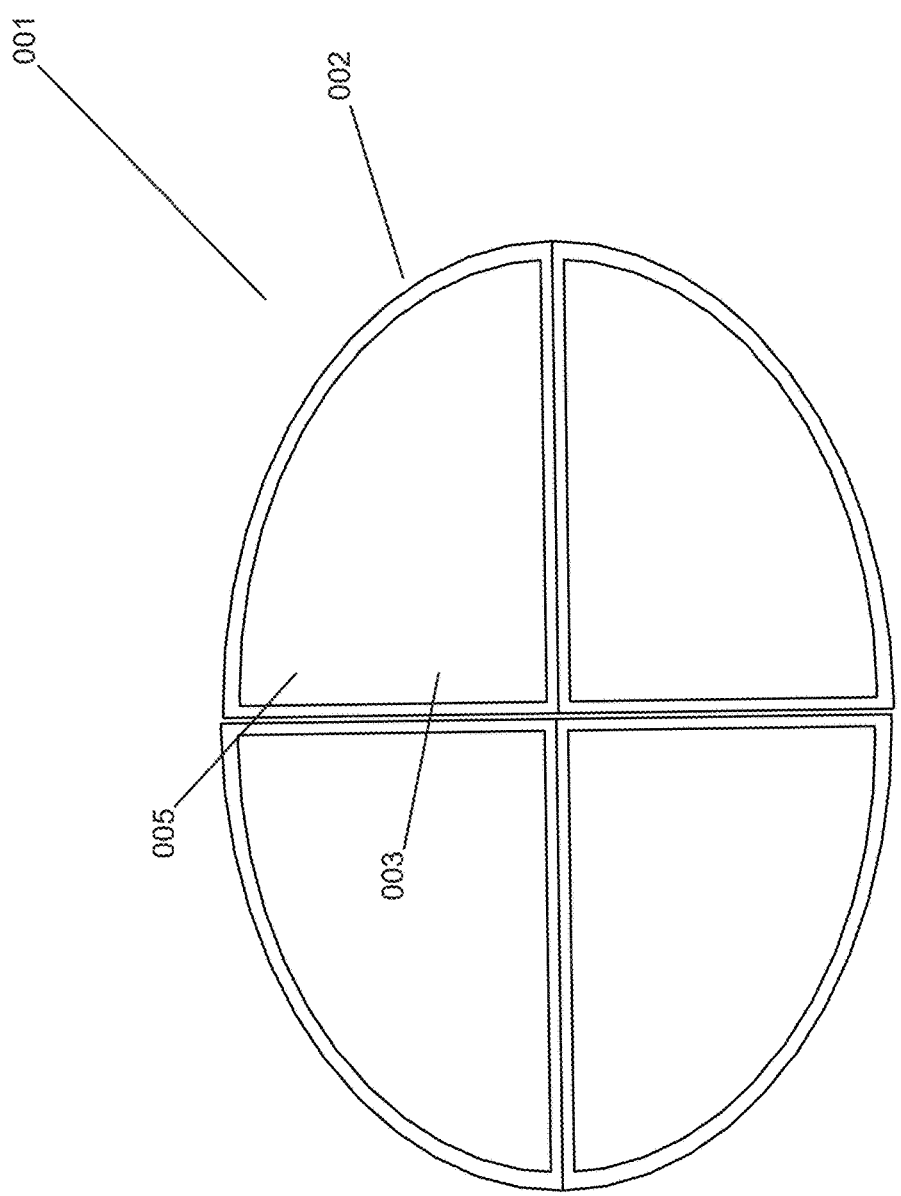

FIG. 9. A top-down view of an embodiment, four divider inserts, of a device and system for a divider insert for a food-heating appliance.

Figure 10:
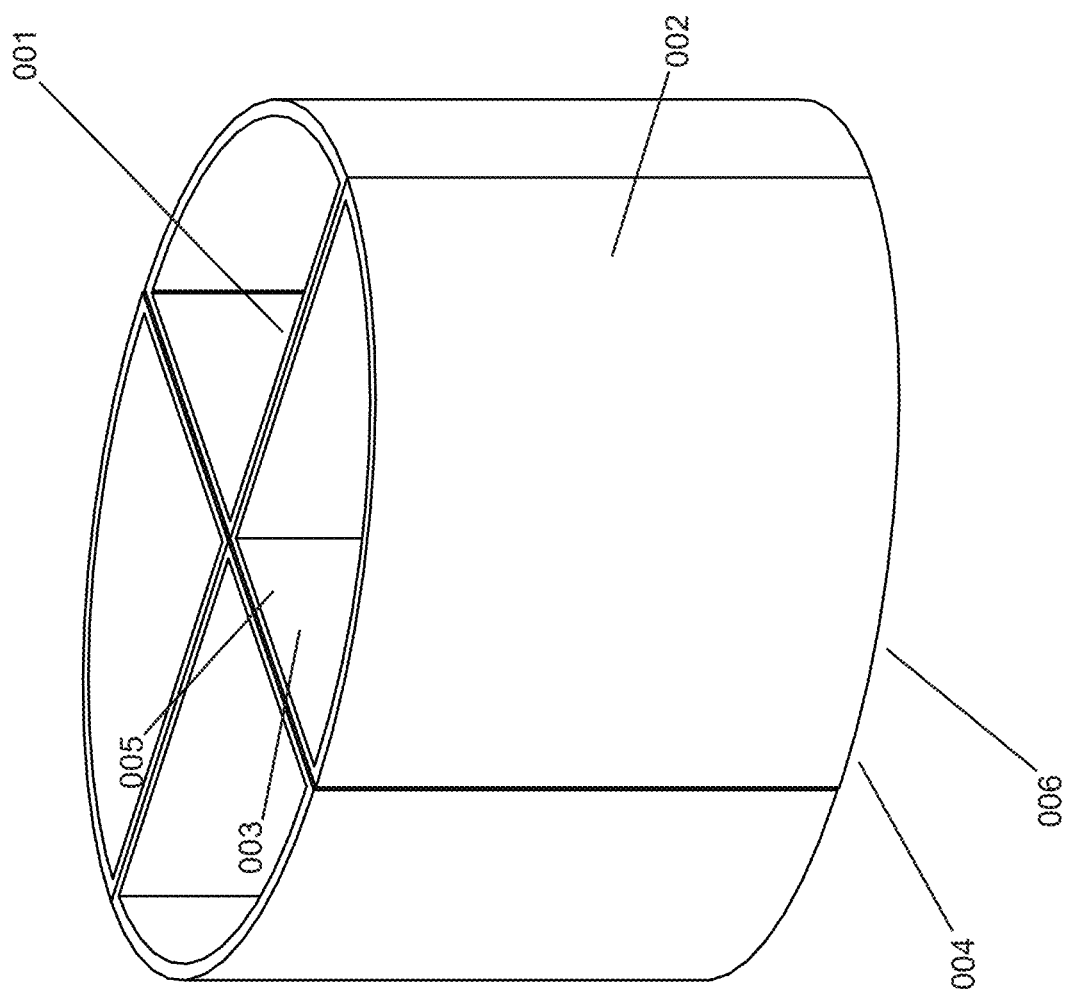

FIG. 10. A perspective view of an embodiment, four divider inserts, of a device and system for a divider insert for a food-heating appliance.

Figure 11:
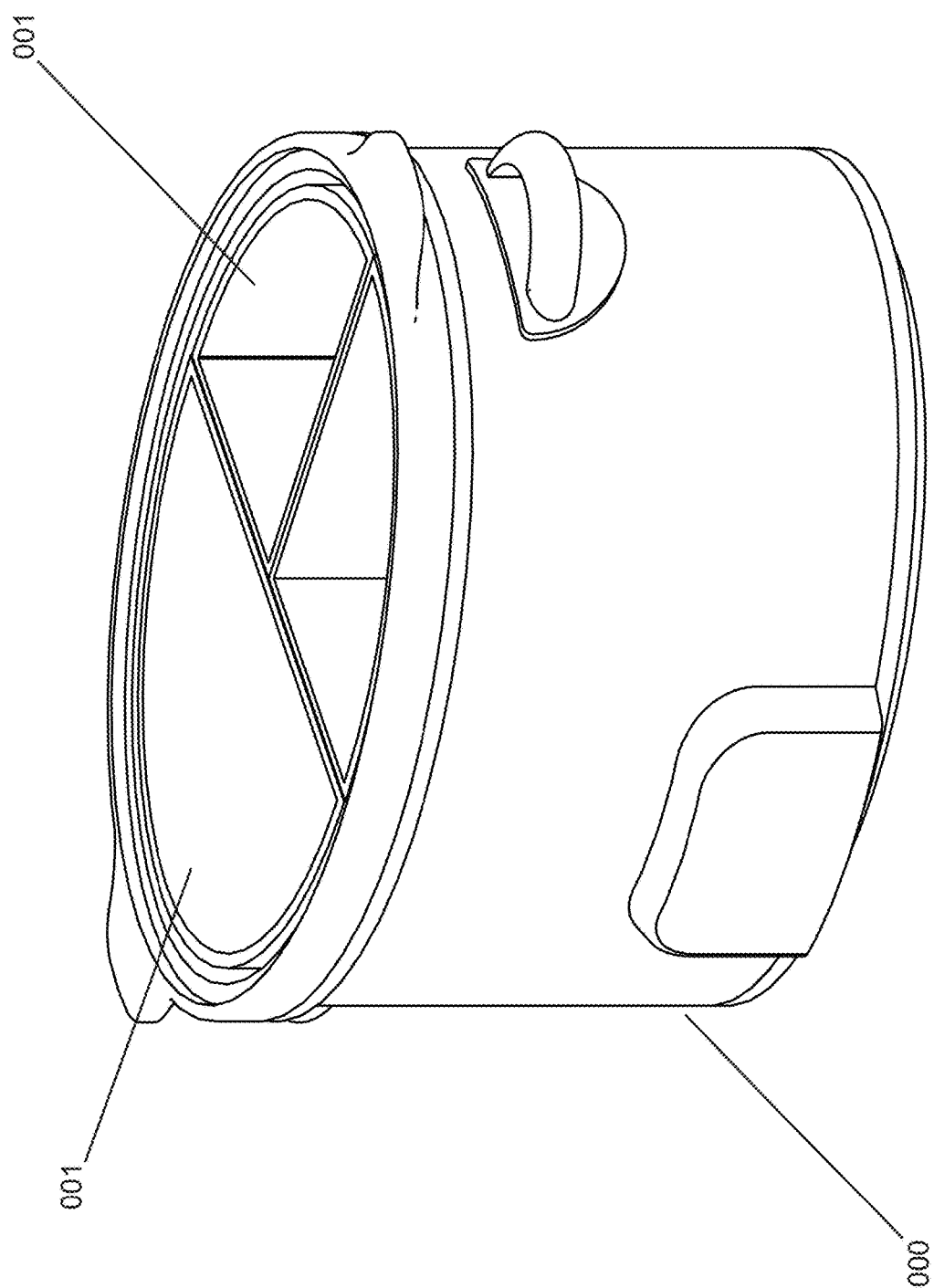

FIG. 11. A perspective view of an embodiment, three divider inserts, of a device and system for a divider insert for a food-heating appliance inserted in a typical food-heating appliance.

Figure 12:
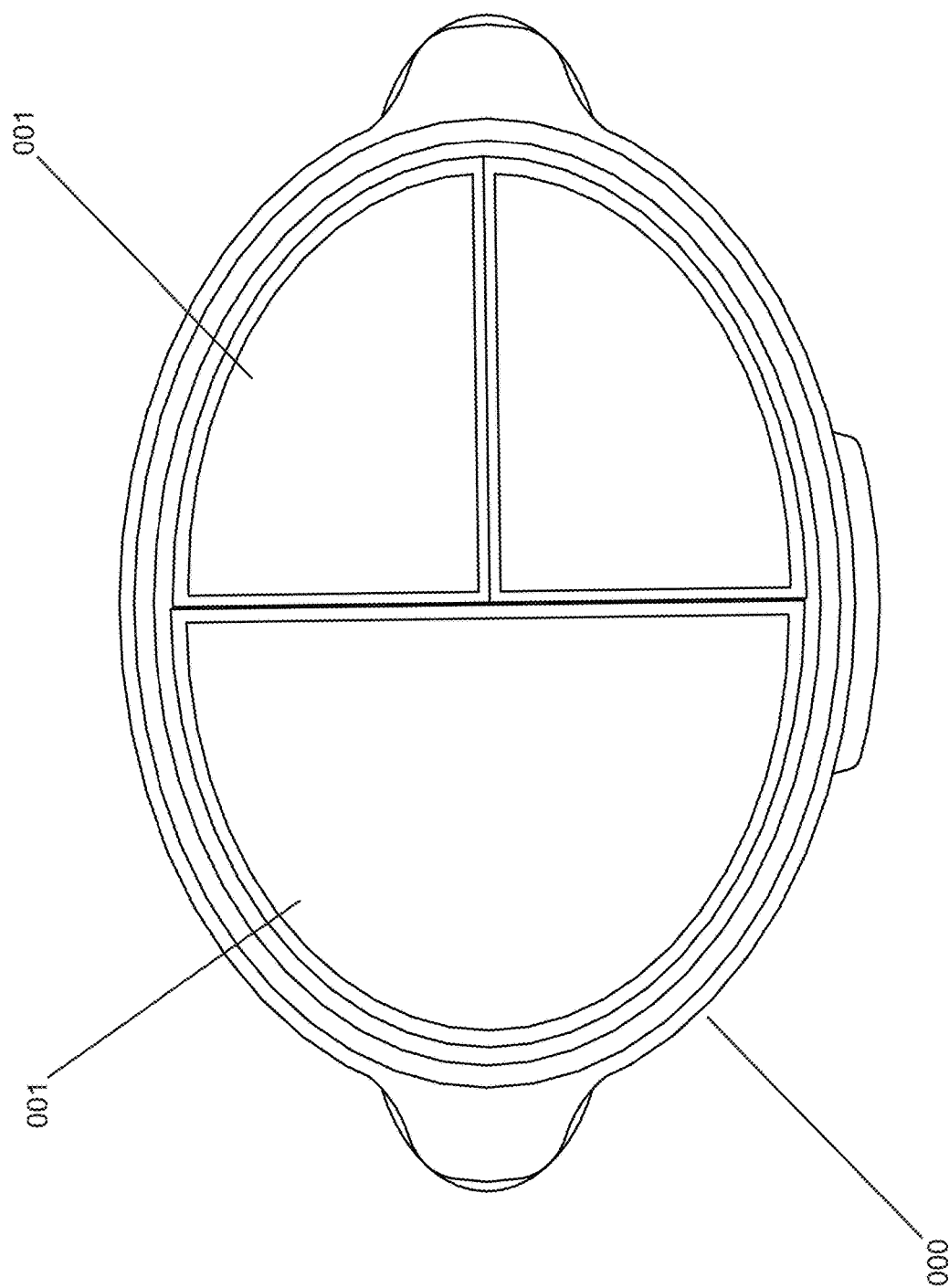

FIG. 12. A top-down view of an embodiment, three divider inserts, of a device and system for a divider insert for a food-heating appliance inserted in a typical food-heating appliance.

Figure 13:
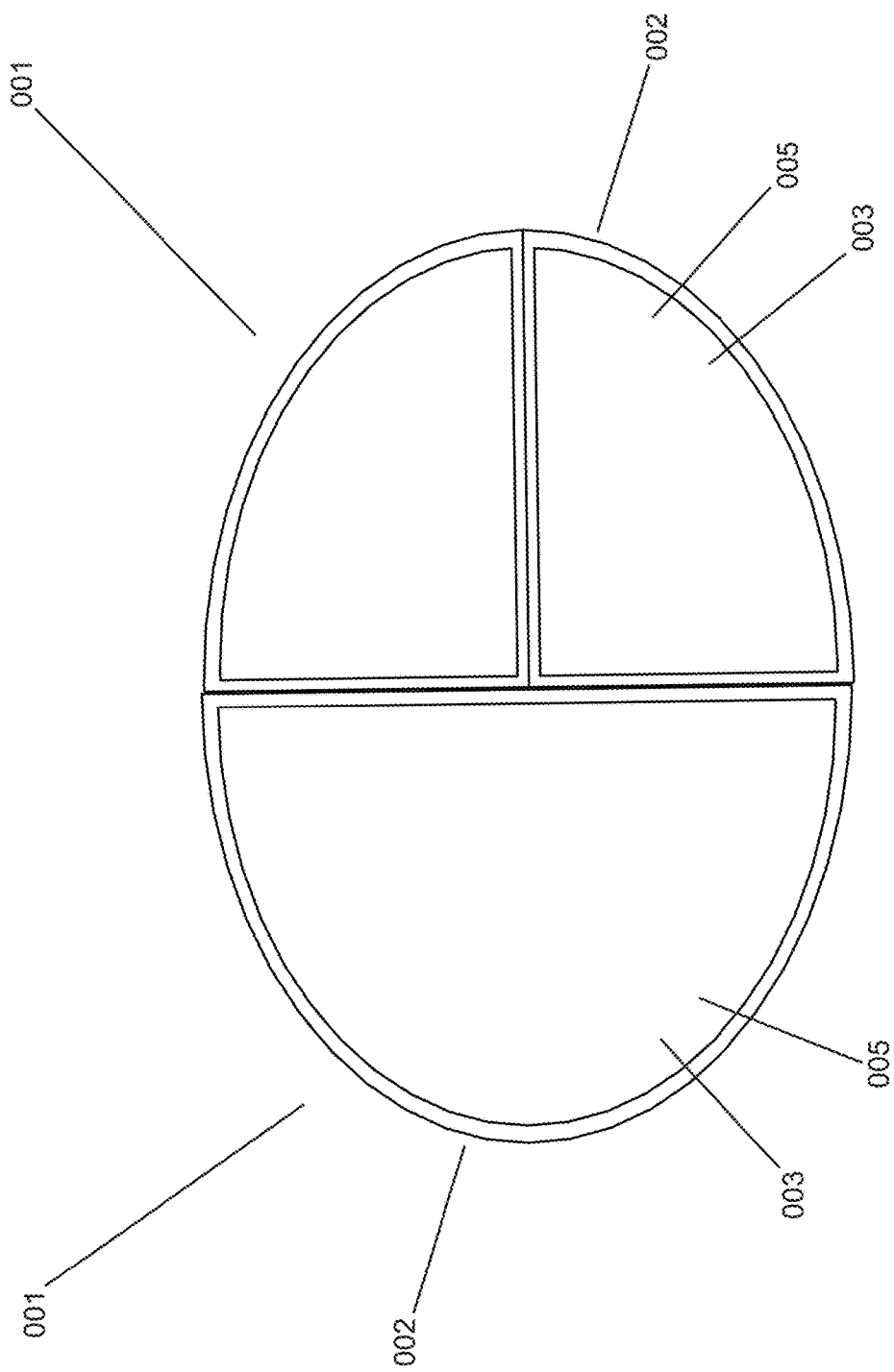

FIG. 13. A top-down view of an embodiment, three divider inserts, of a device and system for a divider insert for a food-heating appliance.

Figure 14:
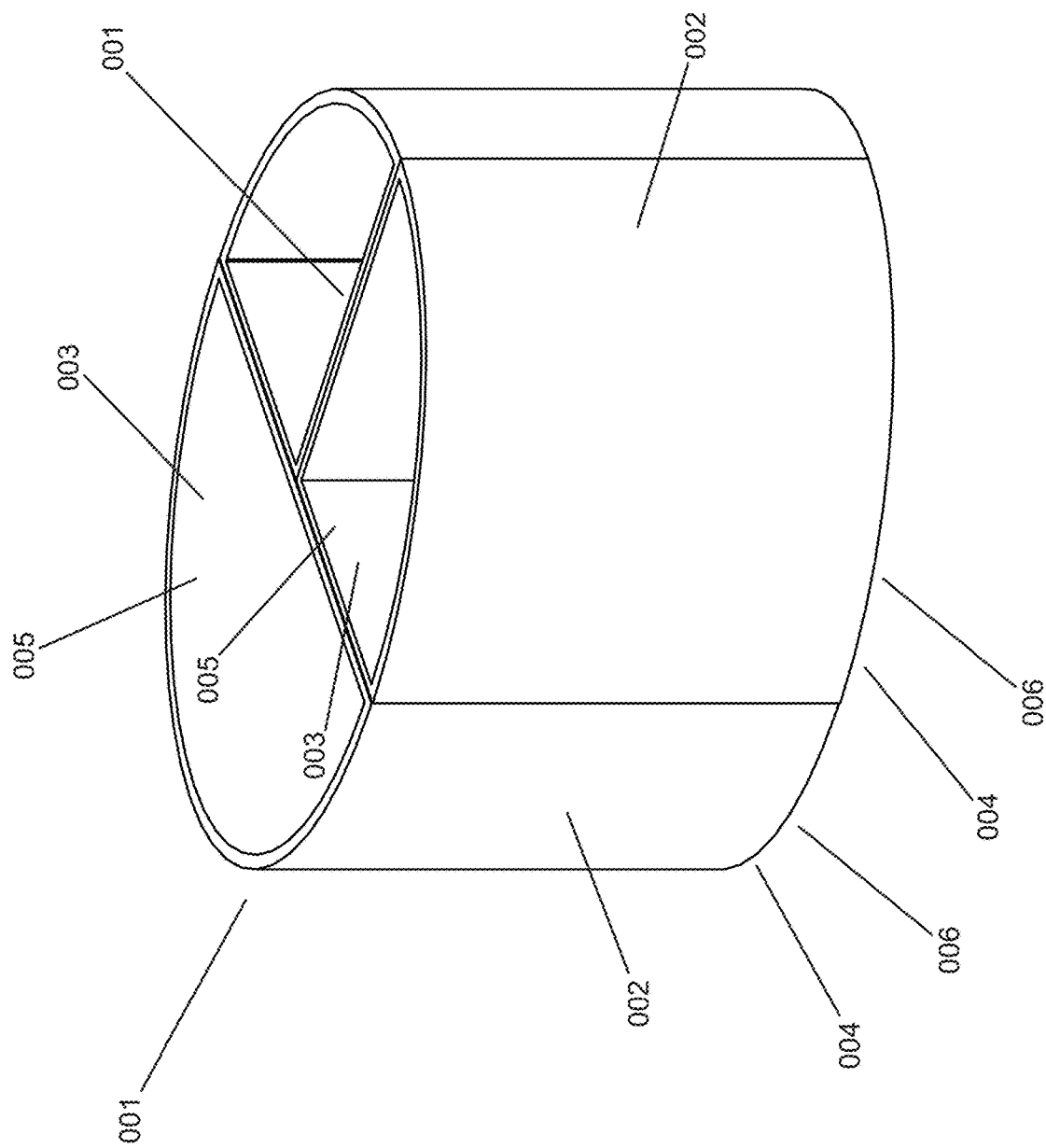

FIG. 14. A perspective view of an embodiment, three divider inserts, of a device and system for a divider insert for a food-heating appliance.

Figure 15:
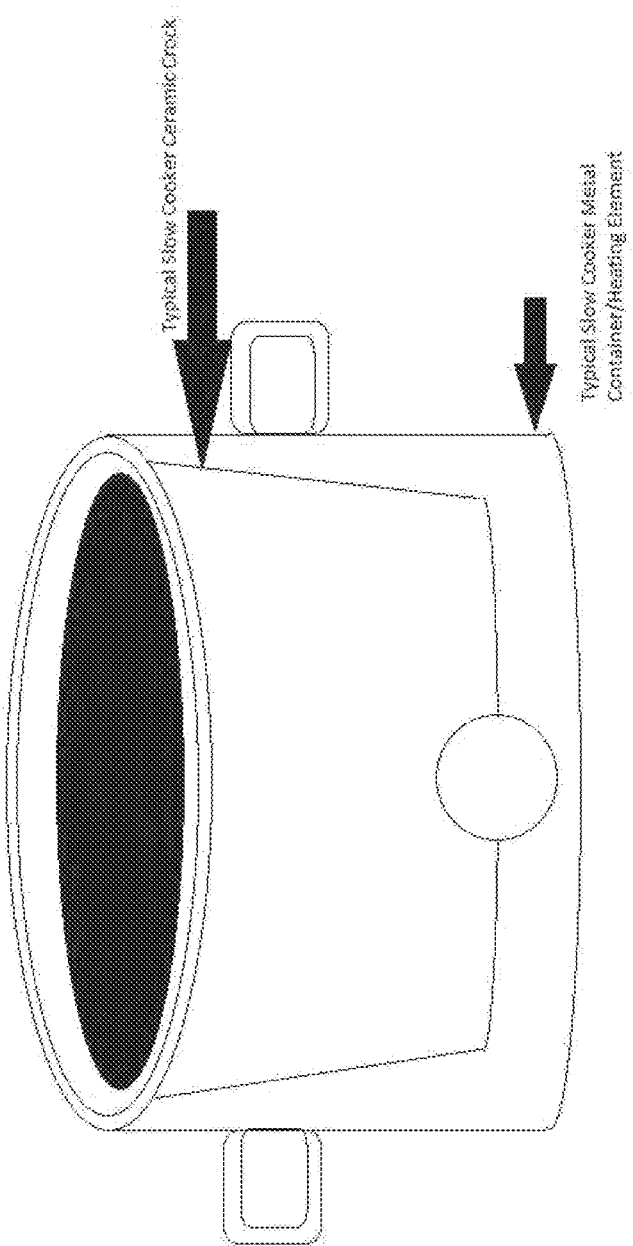

FIG. 15. A side view a hypothetical food-heating appliance.

Figure 16:
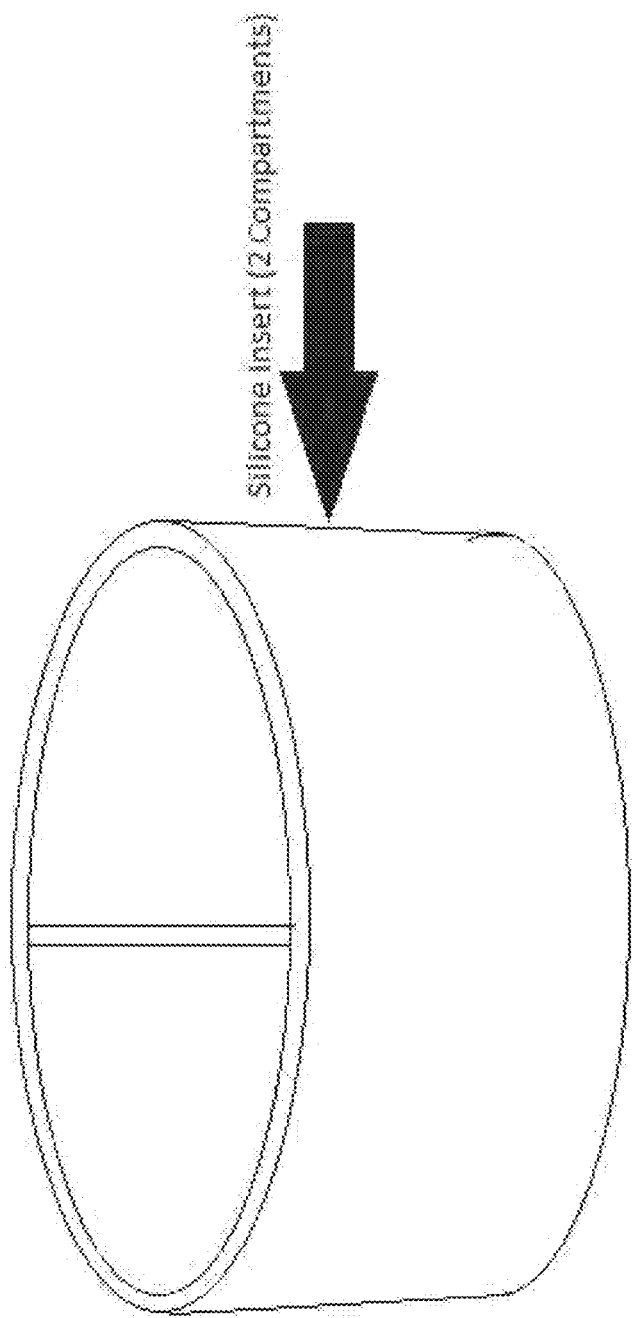

FIG. 16. A side perspective view of an embodiment, a single insert with one divider running laterally to create two divided cooking compartments, of a device and system for a divider insert for a food-heating appliance.

Figure 17:
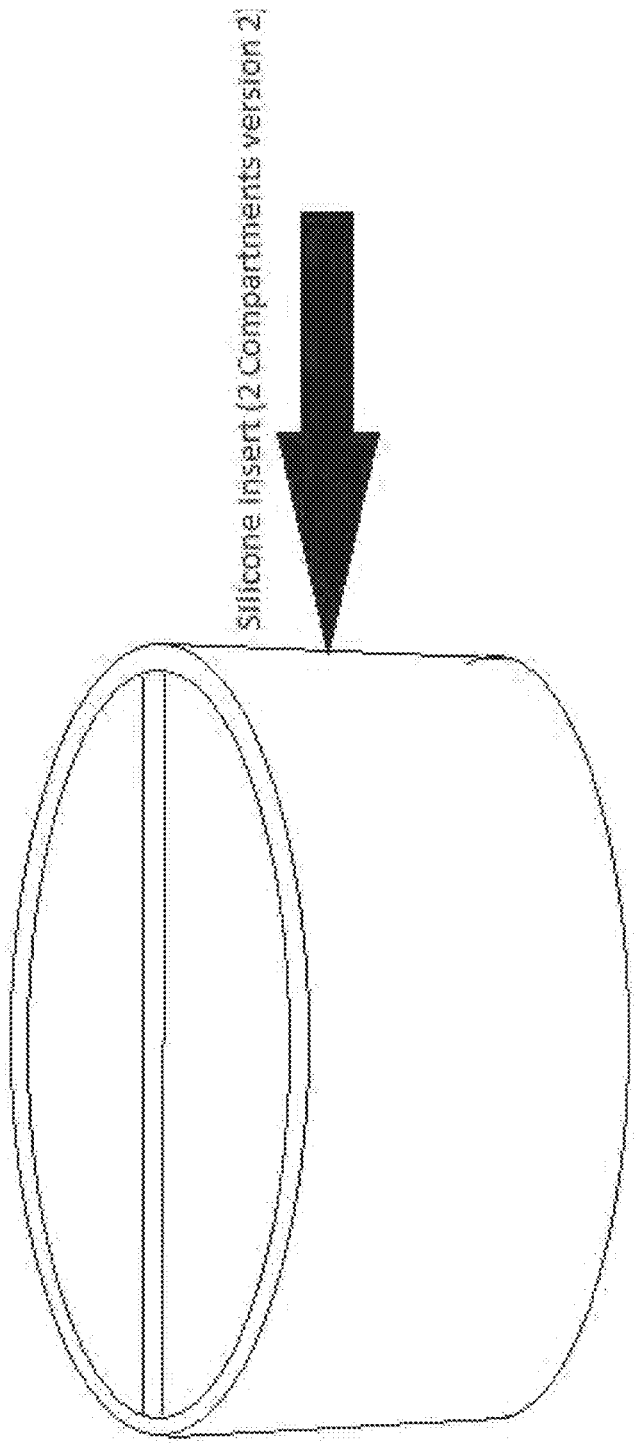

FIG. 17. A side perspective view of an embodiment, a single insert with one divider running longitudinally to create two divided cooking compartments, of a device and system for a divider insert for a food-heating appliance.

Figure 18:
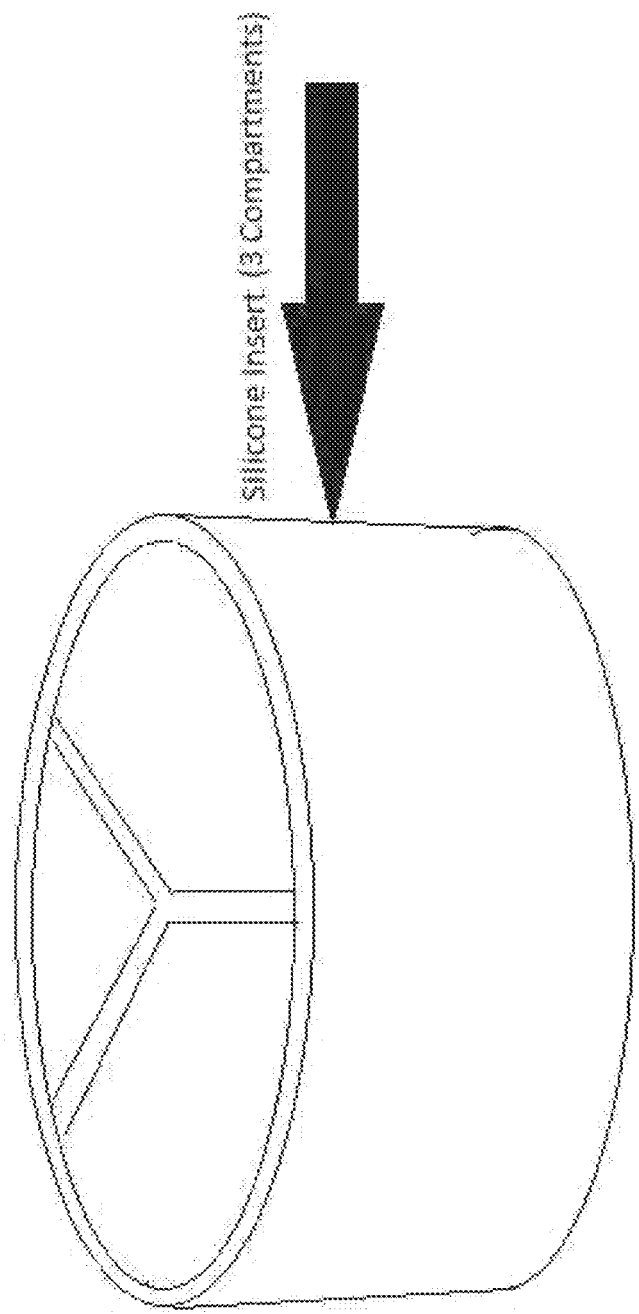

FIG. 18. A side perspective view of an embodiment, a single insert with dividers to create three cooking compartments, of a device and system for a divider insert for a food-heating appliance.

Figure 19:
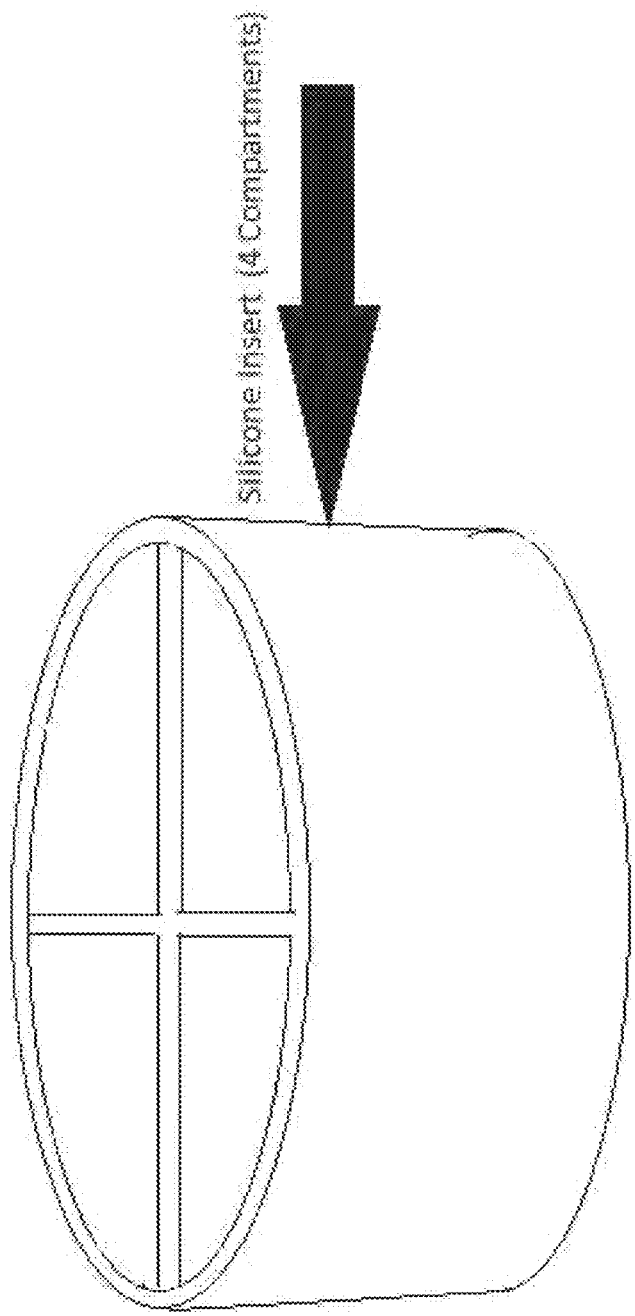

FIG. 19. A side perspective view of an embodiment, a single insert with dividers to create four divided compartments, of a device and system for a divider insert for a food-heating appliance.

Figure 20:
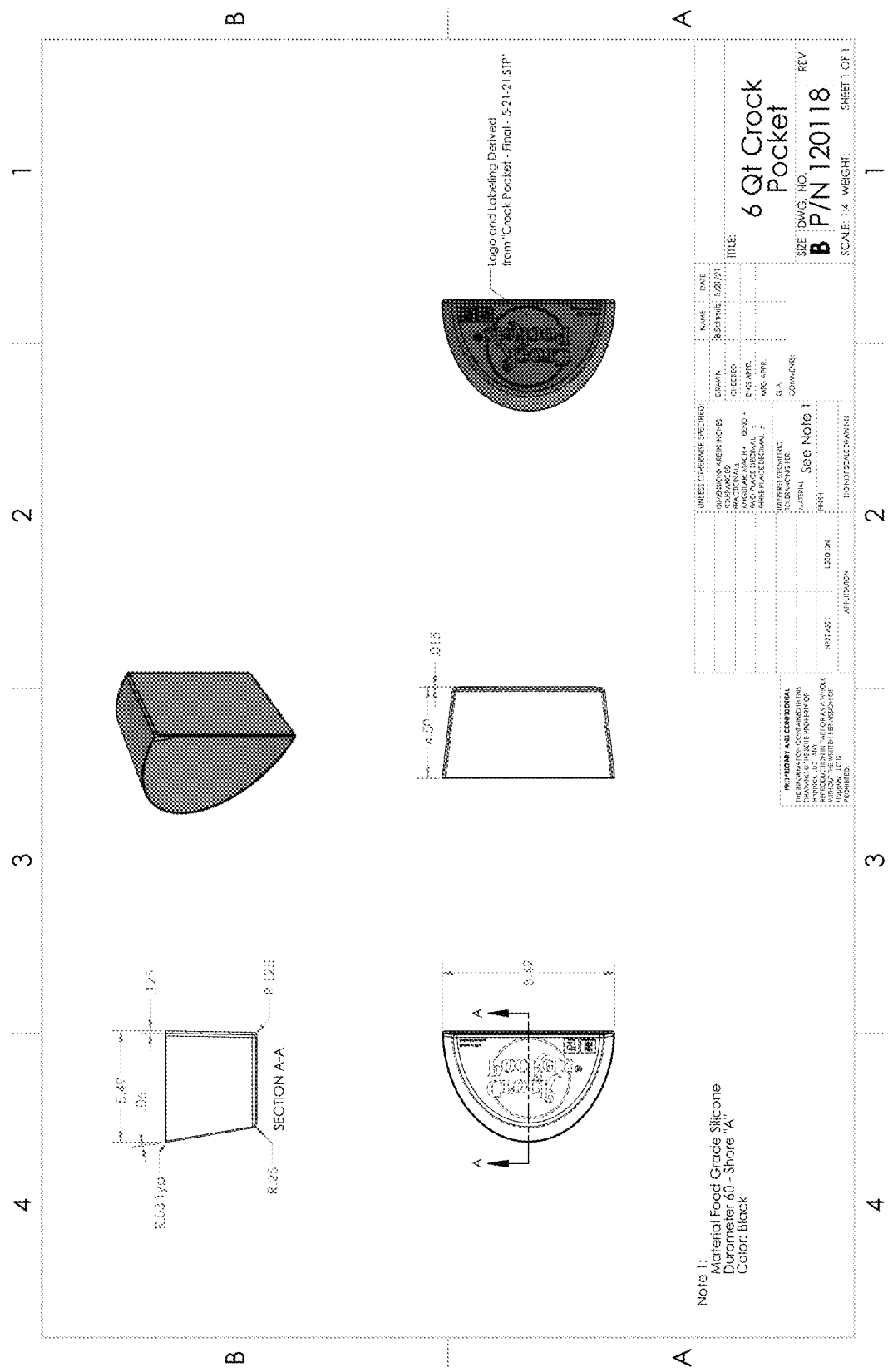

FIG. 20. A cad drawing of a version of an embodiment of the device and system for a divider insert for a food-heating appliance.

LIST OF FIGURE ITEMS

000 A food-heating appliance
001 A divider insert
002 A side wall
003 A top
004 A bottom
005 An open end
006 A closed end

DETAILED DESCRIPTION

The order of the steps of disclosed processes may be altered within the scope of the invention.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The system for a divider insert for a food-heating appliance may, however, be embodied in many different forms and should not be construed as being limited to the embodiments set forth herein; rather, these embodiments are provided by way of illustration only and so that this disclosure will be thorough, complete and fully convey understanding to those skilled in the art.

For the purposes of promoting an understanding of the principles of a device and system for a divider insert for a food-heating appliance, reference will now be made to the embodiments illustrated in the drawings and specific language will be used to describe the same, only as examples and not intended to be limiting.

A food-heating appliance, as used herein may be, a slow-cooker, a crock-pot, a pressure-cooker, an air-fryer, a pot.

As an example, currently, some slow cookers come standard with a round or oval cooking pot, typically made of ceramic or porcelain and referred to as a "crock". This device is usually kept inside a larger round or oval metal device containing a heating element. The lid is typically made of glass and sits flush with the device, to allow the retaining of liquids while cooking. All food ingredients are placed in the ceramic device and cooked according to recipe instructions. When making certain recipes the flavor is typically molded into one overall flavor with the strongest ingredient overpowering the other flavors. Additionally, if two meals were desired to be cooked at the same time, the current standard models of slow cookers do not allow for either option. A silicone insert that has 2, 3 or 4 dividers would be placed into the existing ceramic dish and could allow for the user to make multiple meals or dishes at once, or follow a standard recipe, while retaining the flavors of each major ingredient.

As an example, since 2015, over 170 million slow cookers have been purchased in the US. They average in size from capacities from 500 mL (17 US fl oz) to 7 L (7.4 US qt). Each of these slow cookers could benefit from using a silicone insert to cook meals or side dishes.

Disclosed is a device and system for a divider insert for a food-heating appliance, comprising the following components: (1) A divider insert 001; (2) a side wall 002; (3) a top 003 with an open end 005; (4) a bottom 004 with a closed end 006.

These components, generally speaking, are configured as follows: (1) a side wall is connected to a bottom 004; (2) a bottom 004 forms a closed end 006; (3) a top 003 has an open end 005.

a device and system for a divider insert for a food-heating appliance may also have one or more of the following: tapering of a side wall 002; eyelets at top of a side wall 002; wire inserts to provide rigidity; fold over handles connected to a side wall 002.

The disclosed device and system for a divider insert for a food-heating appliance is unique when compared with other known devices and solutions because it provides: is of a size to accommodate varying food-heating appliances; is re-usable; uses food-grade safe materials.

The disclosed device and system for a divider insert for a food-heating appliance is unique in that it is structurally different from other known devices or solutions. More specifically, the device is unique due to the presence of a plurality of volumetric sizes; a plurality of geometric shapes; a rigid structure; a durable heat-resistant material.

Some embodiments of versions of a device and system for a divider insert for a food-heating appliance comprise the following components: (1) A divider insert 001; (2) a side wall 002; (3) a top 003 with an open end 005; (4) a bottom 004 with a closed end 006.

In some embodiments of versions of a device and system for a divider insert for a food-heating appliance a divider insert 001 may be a single insert with internal side walls 002 to create a plurality of compartments to receive food.

In some embodiments of versions of a device and system for a divider insert for a food-heating appliance a divider insert 001 may be a plurality of separate geometric shapes to create a plurality of separate compartments to receive food.

In some embodiments of versions of a device and system for a divider insert for a food-heating appliance a divider insert 001 may be of a shape, but not limited to, a half-circle, a quarter circle, an oval, a half-oval, a quarter-oval, a food-heating appliance inner cooking unit diameter divided into a plurality of pie shaped sizes.

In some embodiments of versions of a device and system for a divider insert for a food-heating appliance a divider insert 001 may be made of materials like, but not limited to, a non-toxic polymer mostly made from silica (sand), food-grade silicone.

In some embodiments of versions of a device and system for a divider insert for a food-heating appliance a divider insert 001 may be made of materials like, but not limited to, a malleable metal, like heavy-duty aluminum foil.

In some embodiments of versions of a device and system for a divider insert for a food-heating appliance a divider insert 000 is of a height, not meant to be limiting, of 5 cm to 50 cm; a length not meant to be limiting, of 7 cm to 25 cm; a width not meant to be limiting, of 7 cm to 25 cm; a thickness, not meant to be limiting, of 2 mm to 15 mm.

In some embodiments of versions of a device and system for a divider insert for a food-heating appliance a divider insert 001 is colored, and/or textured.

In some embodiments of versions of a device and system for a divider insert for a food-heating appliance a divider insert 001 varies in size volumetrically, not meant to be limiting, from 0.5 liters to 15 liters.

In some embodiments of versions of a device and system for a divider insert for a food-heating appliance a side wall 002 may have ridges from a bottom 004 to a top 003. In some embodiments said ridges provide additional strength to said side wall 002.

In some embodiments of versions of a device and system for a divider insert for a food-heating appliance a divider insert 001 may be tapered, having a different area for each of an open end 005 and a closed end 006.

In some embodiments of versions of a device and system for a divider insert for a food-heating appliance a divider insert 001 may have a plurality of eyelets at a top 003 of a side wall 002.

In some embodiments of versions of a device and system for a divider insert for a food-heating appliance said eyelets facilitate a method to remove a divider insert 001 from a food-heating appliance 000.

In some embodiments of versions of a device and system for a divider insert for a food-heating appliance a divider insert 001 may have an "ear" piece on a top 003 edge of a side wall 002 with or without a hole at the end of an ear, to provide a method to remove a divider insert 001 from a food-heating appliance.

In some embodiments of versions of a device and system for a divider insert for a food-heating appliance in its most complete version comprises the following components: (1) a plurality of divider inserts 000; (2) a side wall 002 with ridges from a top 003 to a bottom 004; (3) a top 003 with an open end 005; (4) a bottom 004 with a closed end 006. (5) eyelets on the top 004 edge of a side wall 002; (6) a tapered side wall 002.

In some embodiments of versions of a device and system for a divider insert for a food-heating appliance these components are connected as follows to result in a single system: a divider insert 000 has a side wall 002 connected to a bottom 004 that is a closed end 006 and a top 003 with an open end 005; formed into a geometric shape.

FIG. 1. A perspective view of an embodiment, two divider inserts, of a device and system for a divider insert for a food-heating appliance with a divider insert 001 inserted in a typical food-heating appliance 000.

FIG. 2. A top-down view of an embodiment, two divider inserts, of a device and system for a divider insert 001 for a food-heating appliance inserted in a typical food-heating appliance 000.

FIG. 3. A top-down view of an embodiment, one-half of two inserts, of a device and system for a divider insert for a food-heating appliance. A divider insert 001 has a a side wall 002 connected to a top 003 with an open end 005; a bottom 004 with a closed end 006.

FIG. 4. A perspective view of an embodiment, one-half of two inserts, of a device and system for a divider insert for a food-heating appliance. A divider insert 001 has a a side wall 002 connected to a top 003 with an open end 005; a bottom 004 with a closed end 006.

FIG. 5. A top-down view of an embodiment, two divider inserts, of a device and system for a divider insert for a food-heating appliance. A divider insert 001 has a a side wall connected to a top 003 with an open end 005.

FIG. 6. A perspective view of an embodiment, two divider inserts, of a device and system for a divider insert for a food-heating appliance. A divider insert 001 has a a side wall connected to a top 003 with an open end 005; a bottom 004 with a closed end 006.

FIG. 7. A perspective view of an embodiment, four divider inserts, of a device and system for a divider insert for a food-heating appliance inserted in a typical food-heating appliance with a divider insert 001 inserted in a typical food-heating appliance 000.

FIG. 8. A top-down view of an embodiment, four divider inserts, of a device and system for a divider insert for a food-heating appliance inserted in a typical food-heating appliance with a divider insert 001 inserted in a typical food-heating appliance 000.

FIG. 9. A top-down view of an embodiment, four divider inserts, of a device and system for a divider insert for a food-heating appliance. A divider insert 001 has a a side wall connected to a top 003 with an open end 005.

FIG. 10. A perspective view of an embodiment, four divider inserts, of a device and system for a divider insert for a food-heating appliance. A divider insert 001 has a a side wall 002 connected to a top 003 with an open end 005; a bottom 004 with a closed end 006.

FIG. 11. A perspective view of an embodiment, three divider inserts, of a device and system for a divider insert for a food-heating appliance inserted in a typical food-heating appliance with a divider insert 001 inserted in a typical food-heating appliance 000.

FIG. 12. A top-down view of an embodiment, three divider inserts, of a device and system for a divider insert for a food-heating appliance inserted in a typical food-heating appliance with a divider insert 001 inserted in a typical food-heating appliance 000.

FIG. 13. A top-down view of an embodiment, three divider inserts, of a device and system for a divider insert for a food-heating appliance. A divider insert 001 has a a side wall 002 connected to a top 003 with an open end 005.

FIG. 14. A perspective view of an embodiment, three divider inserts, of a device and system for a divider insert for a food-heating appliance. A divider insert 001 has a a side wall 002 connected to a top 003 with an open end 005; a bottom 004 with a closed end 006.

FIG. 15. A side view a hypothetical food-heating appliance. This image shows a typical slow cooker design, showcasing the ceramic crock where the divider insert would fit inside prior to cooking. The divider insert would fit where the dark part of the image is showing inside the pot.

FIG. 16. A side perspective view of an embodiment, a single insert with one divider running laterally to create two divided cooking compartments, of a device and system for a divider insert for a food-heating appliance. This is a view of the divider insert that would allow for 2 separate compartments, using one divider in the center across the width of the device.

FIG. 17. A side perspective view of an embodiment, a single insert with one divider running longitudinally to create two divided cooking compartments, of a device and system for a divider insert for a food-heating appliance. This is a view of the divider that would allow for 2 separate compartments, using one divider in the center across the length of the device.

FIG. 18. A side perspective view of an embodiment, a single insert with dividers to create three cooking compartments, of a device and system for a divider insert for a food-heating appliance. This is a view of the divider insert that would allow for 3 separate compartments.

FIG. 19. A side perspective view of an embodiment, a single insert with dividers to create four divided compartments, of a device and system for a divider insert for a food-heating appliance. This is a view of the divider insert that would allow for 4 separate compartments.

FIG. 20. A photograph of a version of an embodiment, two divider inserts, of a device and system for a divider insert for a food-heating appliance with one insert upright and one insert showing a bottom view.

FIG. 21. A photograph of a version of an embodiment, two divider inserts, of a device and system for a divider insert for a food-heating appliance inserted in a food-heating appliance.

FIG. 22. A photograph of an embodiment, two divider inserts, of a device and system for a divider insert for a food-heating appliance inserted in a food-heating appliance with food in each insert.

FIG. 20. A cad drawing of a version of an embodiment of the device and system for a divider insert for a food-heating appliance.

Versions of the invention may be a method of a food-heating appliance with a device and system for a divider insert for a food-heating appliance, comprising: selecting a hypothetical food-heating appliance 000 appropriate for a device and system for a divider insert for a food-heating appliance comprising a divider insert 001; a side wall 002; a top 003 with an open end 005; a bottom 004 with a closed end 006.

Versions of a device and system for a divider insert for a food-heating appliance may be made individually, in batches, or via continuous assembly.

For example, to make a version of a device and system for a divider insert for a food-heating appliance prepare an appropriate work surface and assemble all of the components disclosed herein. Assemble the raw materials in a logical order as someone skilled in the art would do. As an example, not meant to be limiting, start with a silicone mold box; food-grade silicon. Pour the silicone into the silicone mold box of the appropriate shape. Wait for the silicone to cure. Remove the divider insert from the mold box.

For example, to make another version of a device and system for a divider insert for a food-heating appliance a mold may be utilized. This mold will have the same measurements of a typical slow cooker model. Liquid silicone, FDA Approved for food grade use, will be injected into the mold at desired thickness to create the liner. It will then be screen printed or painted.

An example of using a device and system for a divider insert for a food-heating appliance comprises selecting an appropriate food-heating appliance; selecting one or a plurality of a device and system for a divider insert for a food-heating appliance containers of the desired geometric shapes, in this example two half-ovals; inserting the two selected containers into a food-heating appliance; placing uncooked food or food requiring warming into each of the divider inserts (containers); operating the food-heating appliance according to instructions for the particular food-heating appliance; removing the heated food.

Another example of using a device and system for a divider insert for a food-heating appliance comprises selecting an appropriate food-heating appliance and appropriate divider inserts (containers). A silicone insert, container, is placed inside the slow cooker. Food items are placed inside each individual insert and food is prepared per recipe cooking instructions. The silicone divider insert, container, holds the food items for the duration of the cooking and keeps them separate from other items being cooked in nearby compartments (containers).

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

The embodiments of a device and system for a divider insert for a food-heating appliance may be utilized individually, concurrently, or in any sequential combination.

Those skilled in the art to which this application relates will appreciate that other and further additions, deletions, substitutions and modifications may be made to the described embodiments.

The specification is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to "one embodiment," "an embodiment," or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the description to provide a thorough understanding of the invention. These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specifications, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated devices, and such further application of the principles of the invention as illustrated herein are contemplated as would normally occur to one skilled in the art to which the invention relates.

What is claimed:

1. A device and system for a divider insert for a food-heating appliance, comprising:
    a plurality of containers of varying sizes and shapes having a given volume, height and thickness, each of the plurality of containers comprising:
        a curvilinear side wall configured to match the curvilinear interior surface of the food-heating appliance;
        at least one side wall that is straight and flat connected to the curvilinear side wall at each end, or two side walls that are straight and flat connected at one end to each other at a 90-degree angle and at the other ends to the curvilinear side wall; and
        an open top and a bottom of a given thickness, wherein the bottom perimeter edges are connected to the curvilinear side wall and the one or two side walls to form the container suitable for holding food;
    wherein the plurality of containers are configured to create multiple compartments within the food-heating appliance;
    wherein the plurality of containers are reusable and washable;
    wherein at least one container has a shape selected from the group consisting of ovals, half-ovals, quarter-ovals, circles, half-circles, quarter circles, and pie-shaped sections; and
    wherein the curvilinear wall and the side walls are made of is a flexible molded material;
    wherein each of the plurality of containers fits entirely within the food-heating appliance without protruding above the interior space of the food-heating appliance, and the top of each container is free from encumbrances, such as a lip or an edge, that could interfere with the food-heating appliance lid closing and sealing;
    wherein two or more of the plurality of containers are selected and positioned together such that:
        the curvilinear side wall of each container forms a continuous perimeter matching the interior perimeter of the food-heating appliance, with no gaps between the curvilinear side walls and the interior surface of the food-heating appliance;
        the surface area of each curvilinear side wall is in contact with the interior side wall surface of the food-heating appliance; and
        the side walls of adjoining containers abut each other without gaps;
    wherein the absence of gaps between the curvilinear side walls and the interior surface of the food-heating appliance, and between the side walls of adjoining containers:
        maximizes the volume within the food-heating appliance for food storage;
        prevents slippage of the containers within the food-heating appliance; and
        maximizes rigidity of the side walls when there is food product in the containers.

2. The device and system for a divider insert for the food-heating appliance of claim 1, wherein each of the plurality of containers is configured to be removably positioned within the food-heating appliance for simultaneously cooking one or more foods.

3. The device and system for a divider insert for the food-heating appliance of claim 1, wherein the flexible molded material is food-grade silicone.

4. The device and system for a divider insert for the food-heating appliance of claim 1, wherein the side wall of each container is tapered to fit optimally in the food-heating appliance.

5. The device and system for a divider insert for the food-heating appliance of claim 1, wherein the side wall includes ridges extending from the bottom to the top to provide additional strength to the side wall.

6. The device and system for a divider insert for the food-heating appliance of claim 1, further comprising:

a plurality of eyelets or handles located at the top of the side wall to assist with insertion and removal from the food-heating appliance.

7. The device and system for a divider insert for the food-heating appliance of claim 1, wherein the food-heating appliance is selected from the group consisting of slow-cooker, crock-pot, pressure-cooker, air-fryer, and pot.

8. A method of using the device and system for a divider insert for a food-heating appliance of claim 1, the method comprising the steps of:
- selecting one or more containers from the plurality of containers;
- inserting each selected container into the food-heating appliance;
- placing a plurality of uncooked food items into each selected container;
- operating the food-heating appliance to cook the uncooked food items; and
- removing the plurality of containers from the food-heating appliance after the cooking process is complete.

9. The device and system for a divider insert for the food-heating appliance of claim 1, further comprising fold-over handles attached to the side wall.

* * * * *